Oct. 25, 1955 G. C. MEREDEW ET AL 2,721,677

ELECTRIC-MOTOR-DRIVEN PUMPS

Filed Oct. 2, 1951 12 Sheets-Sheet 1

INVENTORS
G. C. Meredew &
G. C. Stevens

By Watson, Cole, Grindle & Watson

Oct. 25, 1955 G. C. MEREDEW ET AL 2,721,677

ELECTRIC-MOTOR-DRIVEN PUMPS

Filed Oct. 2, 1951 12 Sheets-Sheet 2

INVENTORS
G. C. Meredew &
G. C. Stevens
By Watson, Cole, Grindle & Watson

INVENTORS
G. C. Meredew &
G. C. Stevens

By
Watson, Cole, Grindle
& Watson

Oct. 25, 1955 G. C. MEREDEW ET AL 2,721,677

ELECTRIC-MOTOR-DRIVEN PUMPS

Filed Oct. 2, 1951 12 Sheets-Sheet 4

INVENTORS
G. C. Meredew
& G. C. Stevens

By Watson, Cole, Grindle & Watson

INVENTORS
G. C. Meredew
& G. C. Stevens

By Watson, Cole, Grindle & Watson

INVENTORS
G. C. Meredew
& G. C. Stevens
By Watson, Cole, Grindle & Watson

INVENTORS
G. C. Meredew
+ G. C. Stevens
By Watson, Cole, Grindle + Watson

INVENTORS
G. C. Meredew &
G. C. Stevens

By Watson, Cole, Grindle & Watson

Oct. 25, 1955 G. C. MEREDEW ET AL 2,721,677

ELECTRIC-MOTOR-DRIVEN PUMPS

Filed Oct. 2, 1951 12 Sheets-Sheet 9

INVENTORS
G. C. Meredew &
G. C. Stevens

By Watson, Cole, Grindle & Watson

Oct. 25, 1955 G. C. MEREDEW ET AL 2,721,677

ELECTRIC-MOTOR-DRIVEN PUMPS

Filed Oct. 2, 1951 12 Sheets-Sheet 10

INVENTORS
G. C. Meredew &
G. C. Stevens
By Watson, Cole, Grindle & Watson

Oct. 25, 1955 G. C. MEREDEW ET AL 2,721,677

ELECTRIC-MOTOR-DRIVEN PUMPS

Filed Oct. 2, 1951 12 Sheets-Sheet 11

INVENTORS
G. C. Meredew
& G. C. Stevens
BY:
Watson, Cole, Grindle
& Watson
ATTORNEY.

Oct. 25, 1955 G. C. MEREDEW ET AL 2,721,677

ELECTRIC-MOTOR-DRIVEN PUMPS

Filed Oct. 2, 1951 12 Sheets-Sheet 12

INVENTORS
G. C. Meredew
& G. C. Stevens
BY:
Watson, Cole, Grindle
& Watson
ATTORNEY.

2,721,677

ELECTRIC-MOTOR-DRIVEN PUMPS

George Charles Meredew and George Clement Stevens, London, England, assignors to Bernard Bercovitz, Leaside, Ontario, Canada Application October 2, 1951, Serial No. 249,250

Claims priority, application Great Britain December 12, 1949

5 Claims. (Cl. 222—333)

Figure 1:
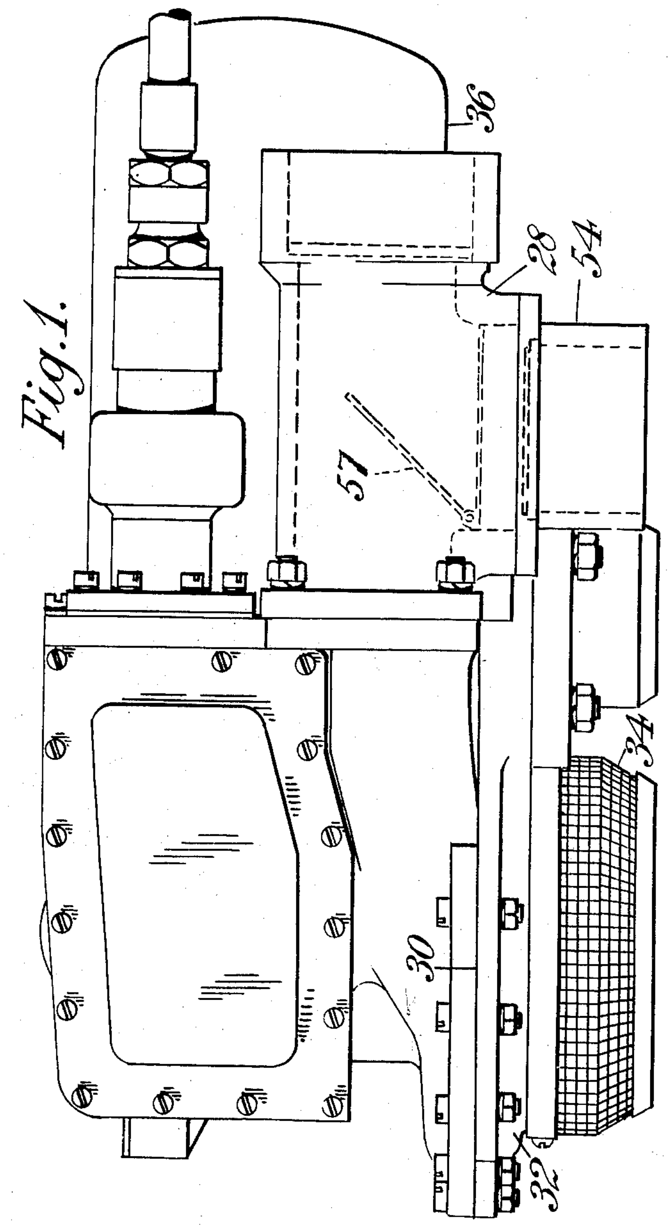

This application is a continuation-in-part of our application Serial No. 170,314 filed June 26, 1950, now abandoned.

The invention relates to electric-motor driven pumps and is concerned with rotary pumps of the kind used as fuel pumps in aircraft in which the motor and the pump, or the motor and a major portion of the pump, are constructed as a unit and located within a tank for the fuel and are normally submerged in the fuel. In such pumps as previously constructed the motor shaft is directly coupled to, and in line with, the pump impeller with the disadvantages that the impeller necessarily rotates at the speed of the motor and the position or attitude of the motor is determined by the impeller.

According to the present invention a pump unit of the above kind comprises a cover plate for an aperture in a wall of the tank, a rotary pump having an impeller, and an electric driving motor therefore, the pump and motor being secured as a unit on the inner face of the cover plate and a geared driving connection between the motor and pump, the cover plate being of a size and shape to form a closure for an aperture aforesaid through which the pump and motor unit may be passed attached to the plate and the pump and motor being arranged to operate submerged in the fuel.

The gear connection may provide a reduced ratio (e. g. the impeller may rotate at about ½ or ⅓ of the speed of the motor) and/or it may provide an angular drive (e. g. a right-angled drive) between the motor and the impeller so that, for example, the motor may lie horizontally when the pump impeller is arranged for rotation about a vertical axis thereby reducing the height of the pump and motor unit.

The unit is preferably attached to a cover plate for an aperture in a tank wall and may be removed from the tank wall with the plate and withdrawn through the aperture. In one form of this arrangement the axis of the pump is substantially parallel to the cover plate, the axis of the motor is substantially perpendicular to the cover plate and the pump lies between the motor and the cover plate and wholly or partly supports the unit from the cover plate by its attachment thereto. The axis of the motor may intersect the axis of the impeller.

It is further preferred that the pump unit be attached at one end thereof to the cover plate and means be provided for supporting the unit at the other end or at a position intermediate in the length thereof, from the tank, the supporting means being arranged to release the unit for withdrawal with the cover plate as aforesaid. In one such construction the pump is attached to the cover plate and the supporting means comprise a spigot and socket connection between the end of the motor, or a part thereon or attached thereto, and a fixed part of the tank, the connection being arranged to be made and broken in the axial direction of the motor so that withdrawal of the cover plate and motor in the direction of the axis of the motor automatically effects disengagement of the connection. Conveniently the connection comprises a boss on the end of the motor which is a press fit into a resiliently expansible socket on a tank member. Preferably the boss is of part spherical form to permit angular adjustment of the unit. Alternatively the boss may be provided on the tank member and the socket on the motor. The part of the connection which is attached to the motor may be carried on a cover which surrounds, or partly surrounds, the motor and is secured at the other end to the pump or to the other end of the motor.

Figure 2:
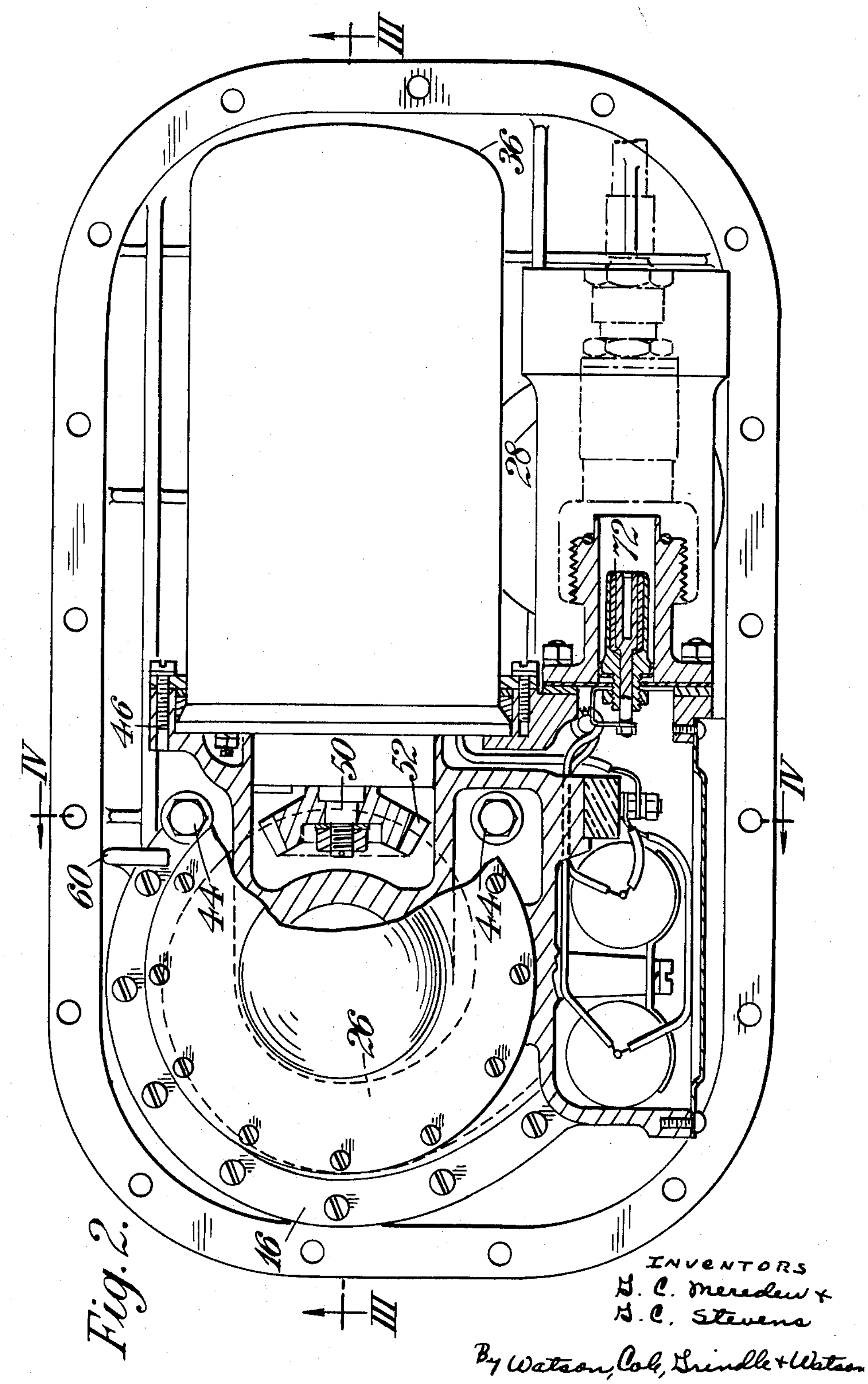
Figure 3:
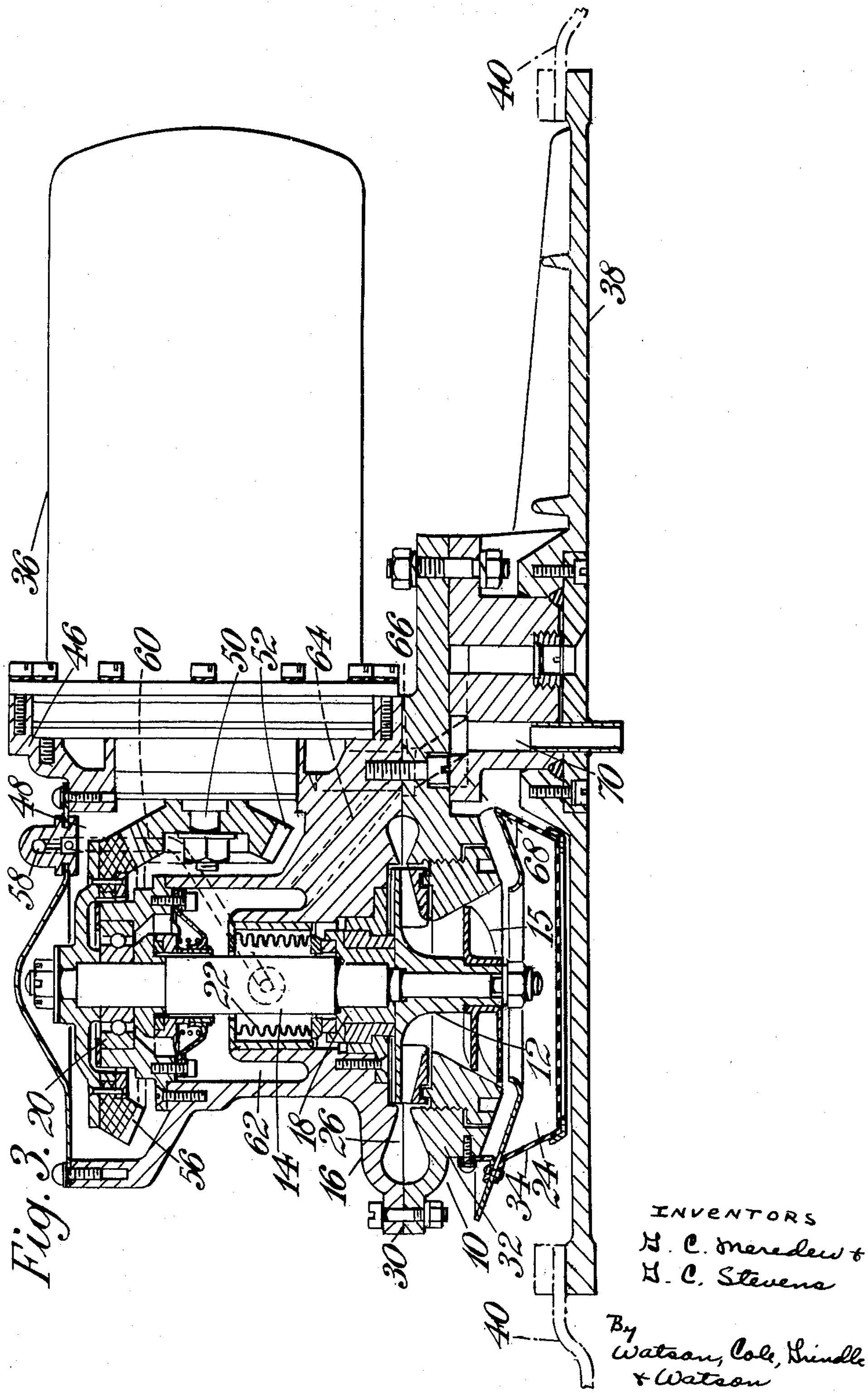
Figure 4:
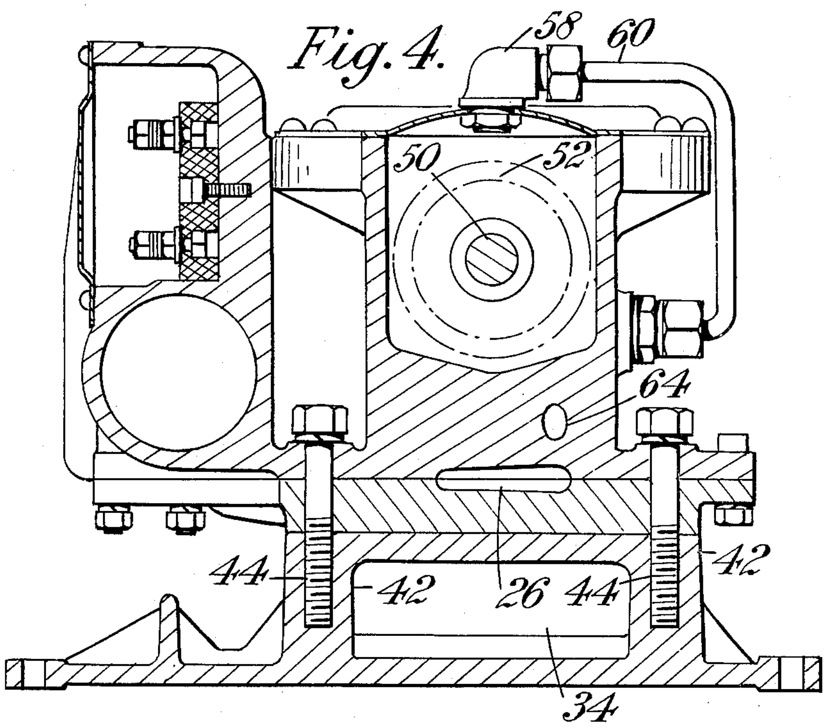
Figure 5:
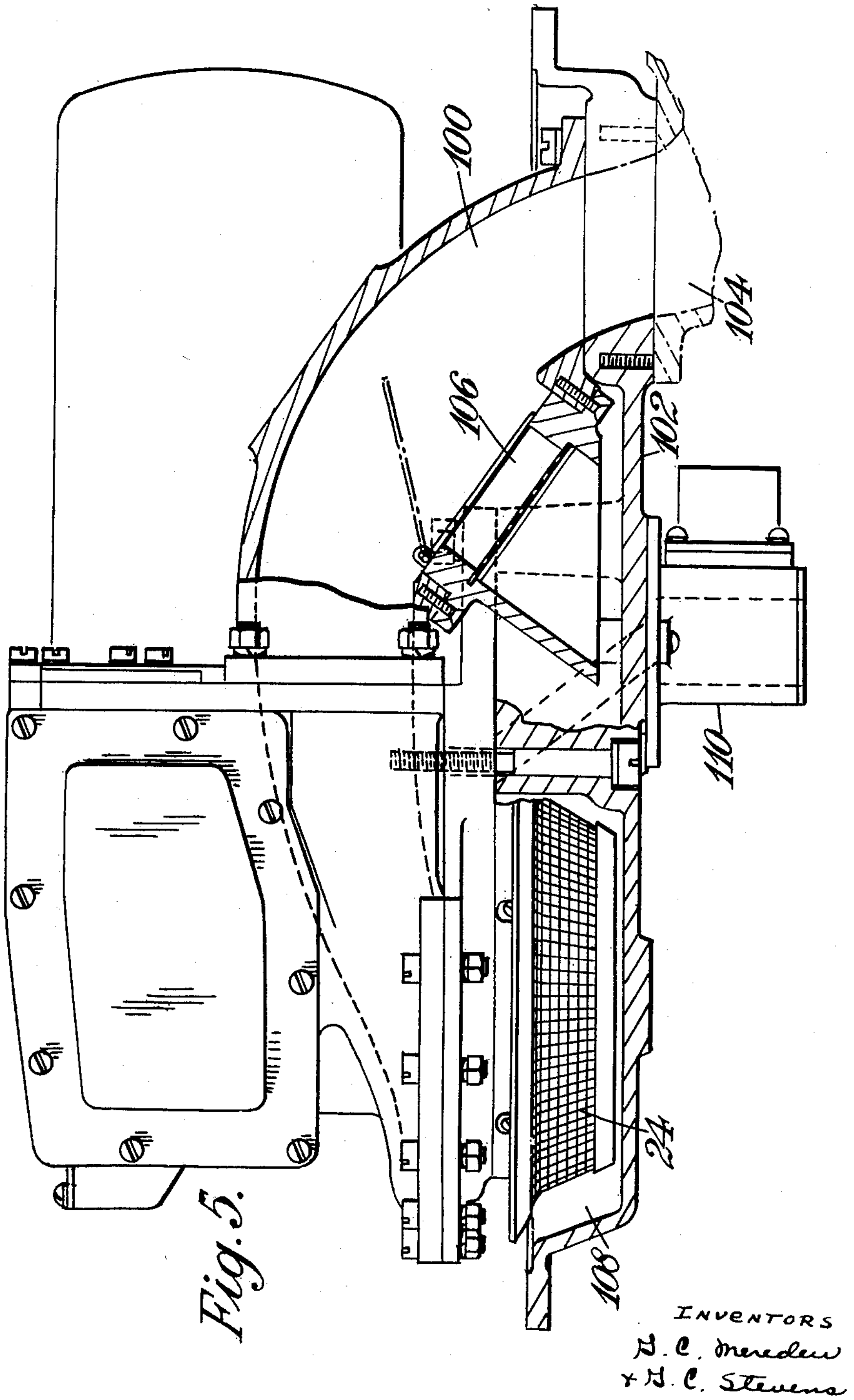
Figure 6:
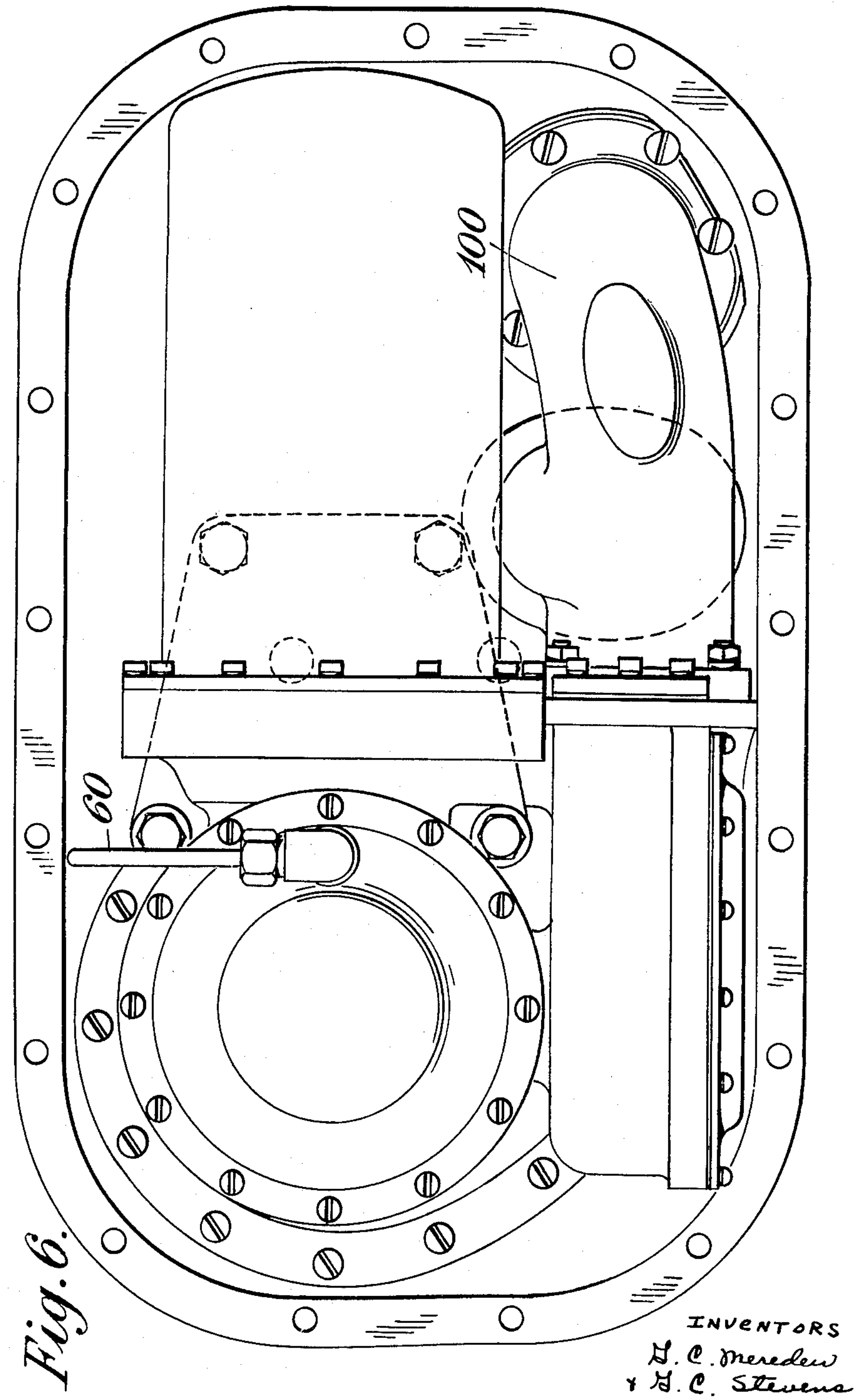
Figure 7:
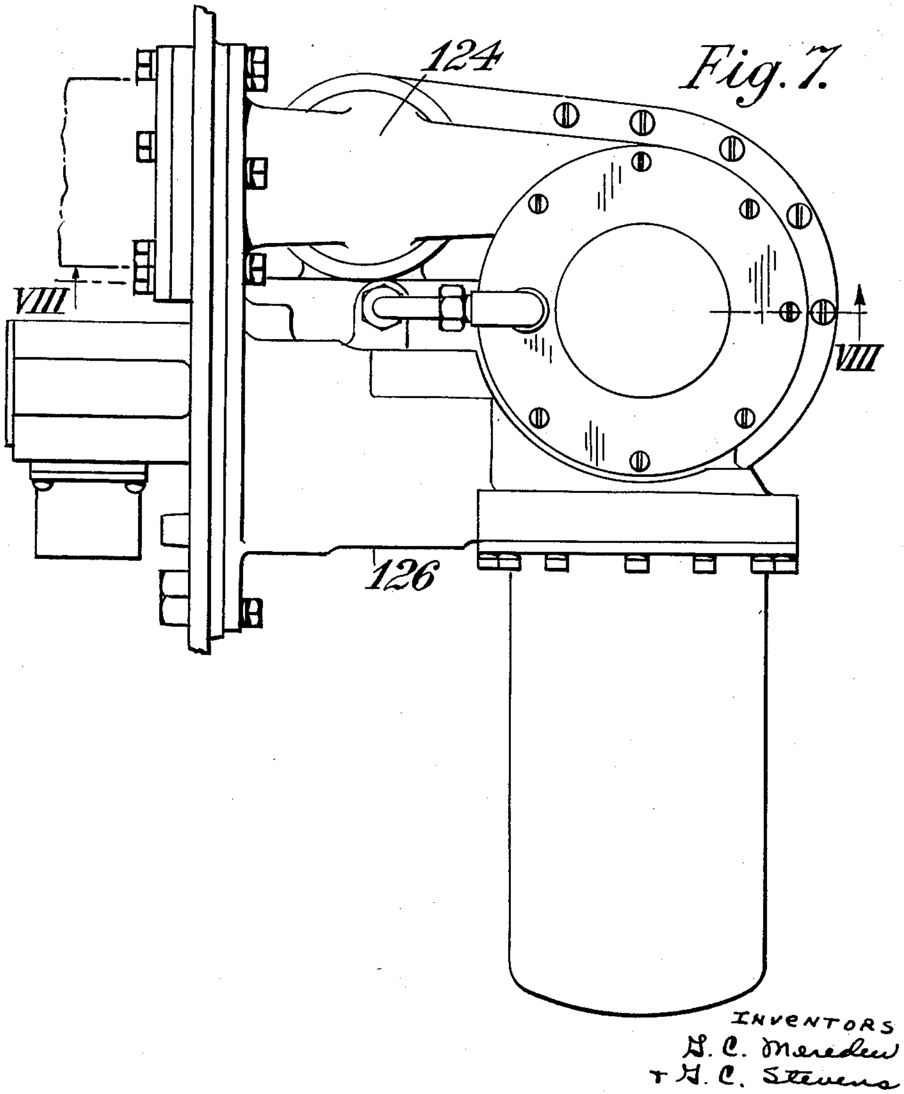
Figure 8:
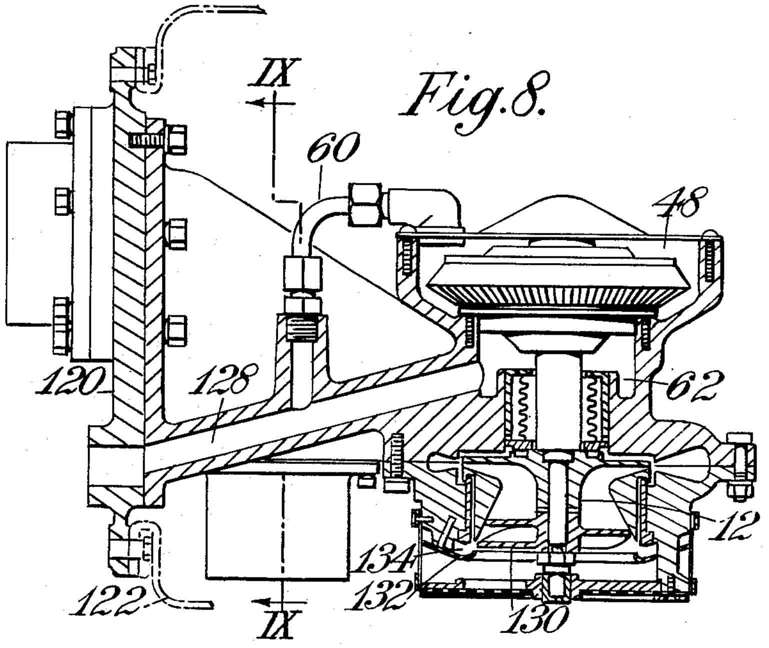
Figure 9:
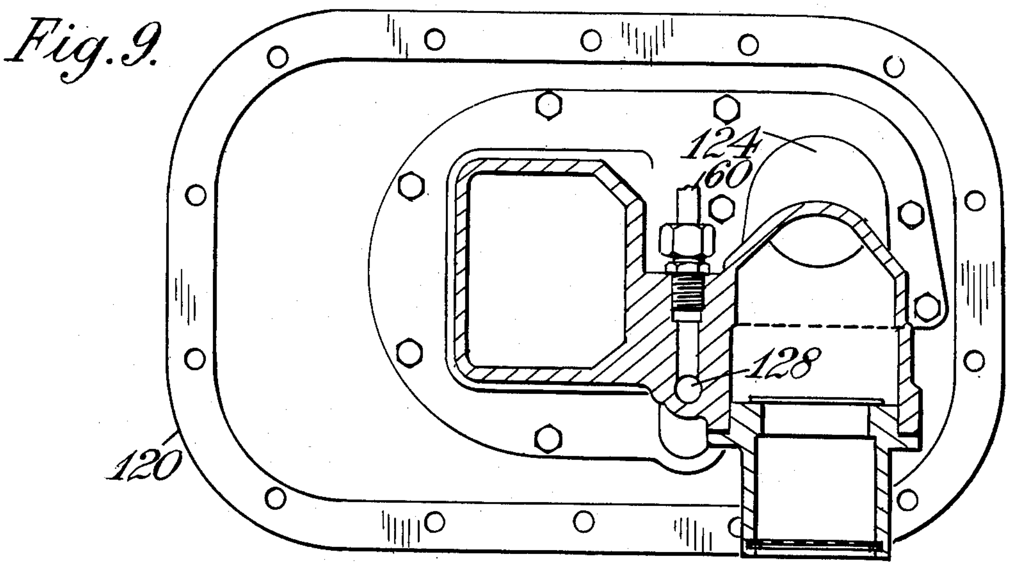
Figure 10:
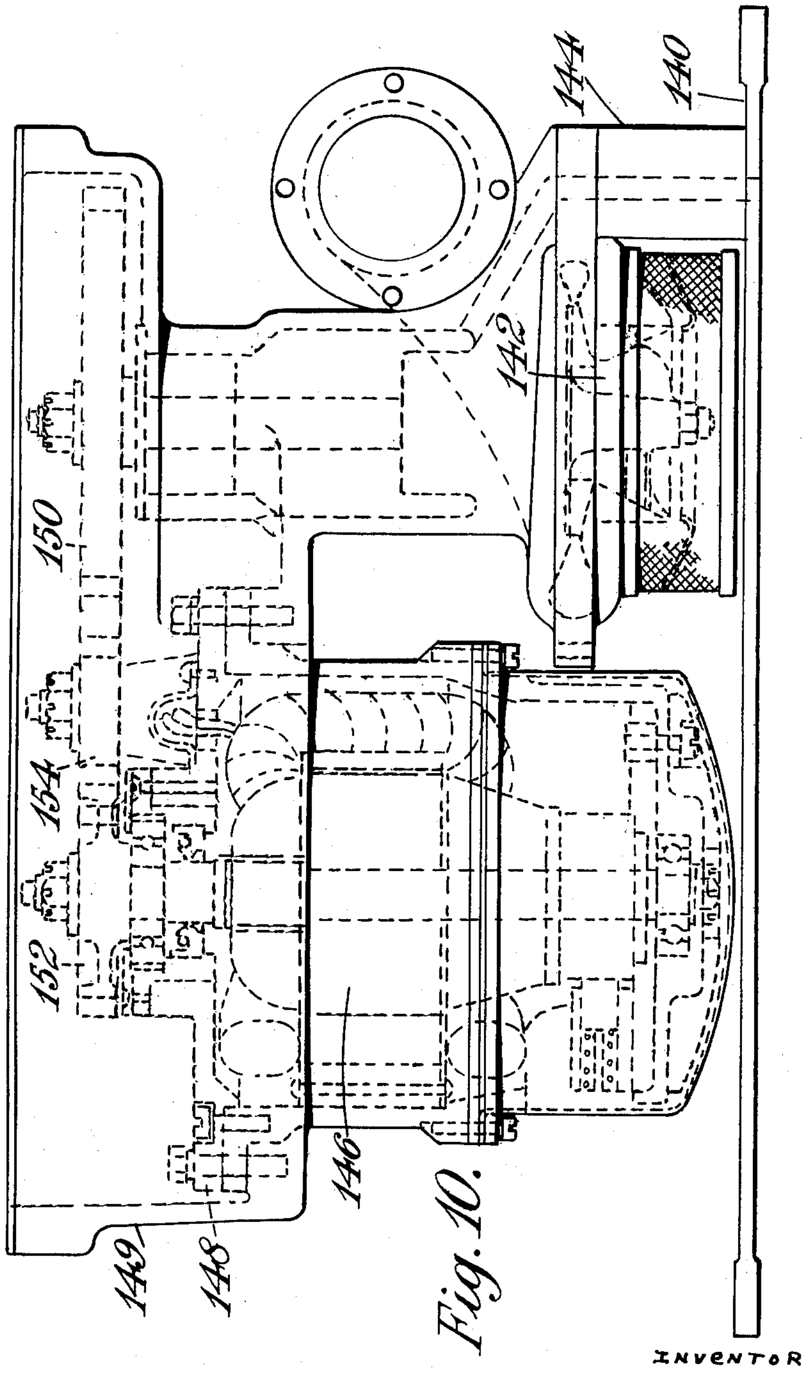
Figure 11:
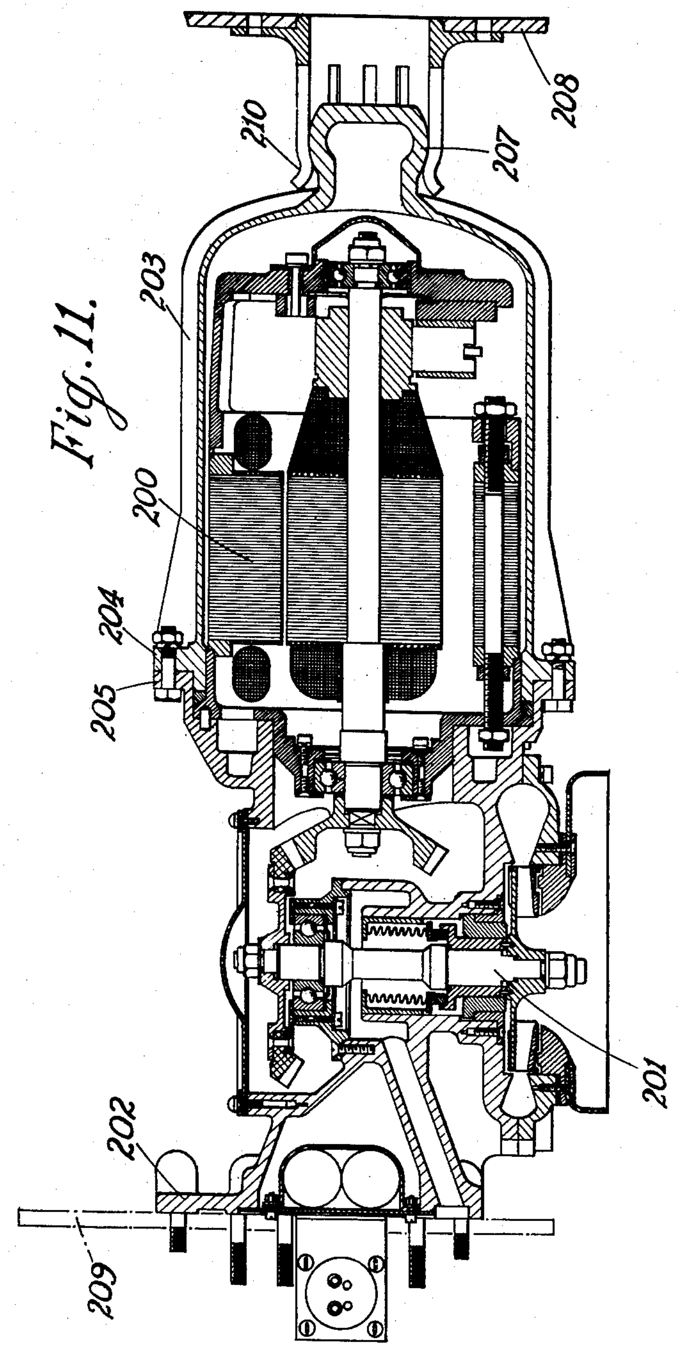
Figure 12:
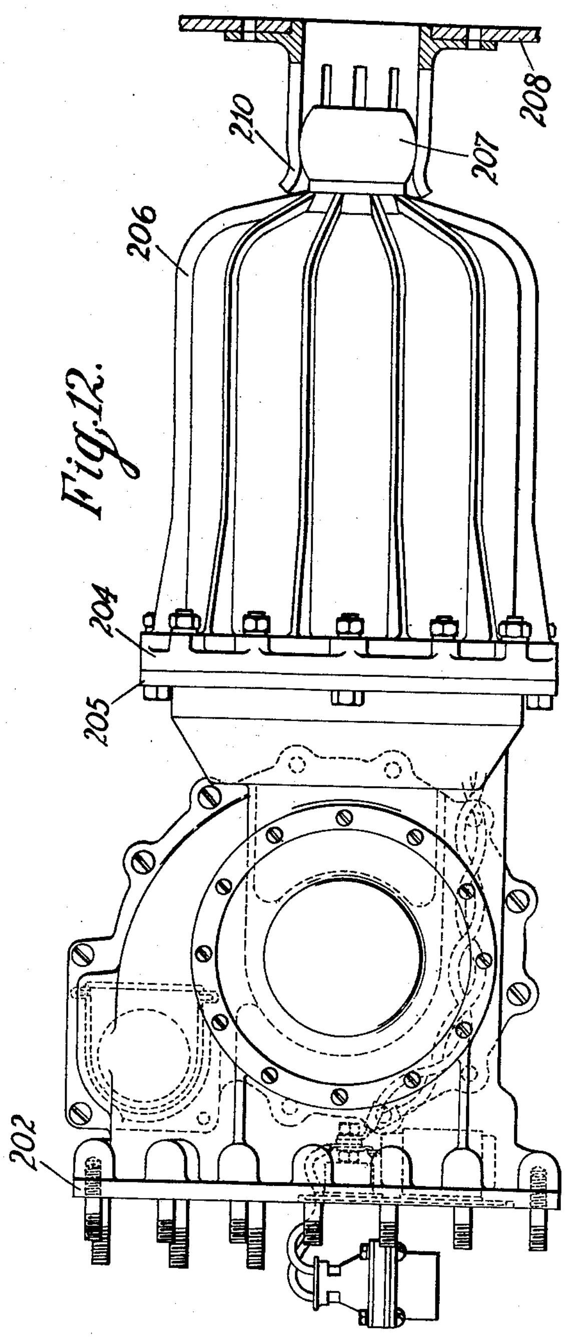

Some specific examples of electrically driven fuel pumps according to the invention and for use in aircraft wing or fuselage tanks will now be described with reference to the accompanying drawings in which:

Figure 1 is a side view of a pump unit,

Figure 2 is a plan view of the unit arranged on a cover plate and partly broken away, Figure 3 is a section on the line III—III in Figure 2, Figure 4 is a section on the line IV—IV in Figure 2, Figure 5 is a view corresponding to Figure 3 but viewing a modified arrangement, Figure 6 is a plan view of the arrangement shown in Figure 5, Figure 7 is a plan view of a further arrangement, Figure 8 is a section on the line VIII—VIII in Figure 7, Figure 9 is a section on the line IX—IX in Figure 8, Figure 10 is a side view illustrating another arrangement of pump unit, Figure 11 is a section through a further arrangement of pump unit, and Figure 12 is a plan of the unit shown in Figure 11.

In the example shown in Figures 1–4 the pump 10 is of the centrifugal type and the impeller 12 is carried on the lower end of a vertical shaft 14. Combined with the impeller 12 there is a screw impeller 15 which directs fuel into the eye of the impeller 12. The pump casing 16 surrounds the impeller and provides two bearings 18, 20 for the shaft vertically above one another and above the impeller. A bellows gland 22 between the bearings prevents leakage of fuel along the pump shaft and the lower bearing 18, is of a kind which does not require lubrication. The pump inlet 24 is at the bottom of the casing below the eye of the impeller and around the impeller there is a volute chamber 26, leading to an outlet pipe connection 28. The volute chamber is split at 30 along its horizontal centre line, the top half being integral with the pump body whilst the lower half 32 is constructed as a separate unit interchangeable with other units designed to suit alternative designs of impeller units or different pump mountings as later referred to. The inlet is covered by a gauze 34. The pump body carries the motor 36 as later described. The unit constituted by the pump and motor is attached to a rectangular cover plate 38 for an aperture in the bottom of the tank 40 through which the unit may be removed. The pump inlet is elevated from the surface of the plate by means of a bridge 42 on the plate to which the pump body is secured by screws 44.

The motor 36 is attached to a flange 46 around an aperture in the side of the pump body and the axis of the motor extends horizontally and perpendicular to the axis of the impeller. The aperture in the pump body communicates with a portion 48 of the body which is above the upper bearing 20 and sealed, by the gland, from the impeller housing.

The motor spindle 50 carries a bevel gear 52 which meshes with a mating gear or crown wheel 56 which is mounted on the impeller shaft 14. These mating gears are of spiral tooth form and the two gears form a right-angled drive, with the crown wheel on the upper end of the impeller shaft.

The pump outlet 28 is within the tank and may be connected to a discharge pipe contained within the tank. There is a by-pass 54 and valve 57 leading from the tank directly into the outlet 28 whereby fuel may be drawn from the tank without passing through the pump.

A vent 58 fitted with a non-return valve, in the top of the housing 48 containing the gears connects through a pipe 60 with a sump 62 around the gland and there is a drain 64, 66, 68, 70 from the sump to the outside of the tank.

Electrical connections to the motor are made through a socket 72.

The unit includes radio interference suppressors 71 housed within the pump casing.

Figures 5 and 6 show a modified arrangement of that just described. In this modified arrangement the pump outlet leads to an outlet conduit 100 which is secured to the cover plate 102. An outlet pipe connection 104 is attached to the cover plate and communicates with the conduit 100. A by-pass valve 106 leading into the tank is provided to enable fuel to be drawn into the conduit without passing through the pump.

The cover plate 102 is, in this construction, dished to form a shallow sump 108 and the pump inlet 24 is received within the sump.

A socket 110 for electrical connections to the motor is provided on the cover plate and this socket also provides a pressure balance connection to the casing of the motor, this casing being sealed from the contents of the tank.

Figures 7–9 show a pump unit according to the invention attached to a cover plate 120 for an opening in the side of a fuel tank 122. The pump and motor unit is supported from the cover plate by the pump outlet pipe 124 and a bracket 126 which are both integral with the upper part of the pump casing. A drain connection 128 leads from the sump 62 through the cover plate and the vent connection 60 from the gear housing 48 also leads to the drain connection.

The pump has a centrifugal impeller 12, and a screw impeller 130 which directs the fuel into the eye of the impeller 12. There is also, as in the previous examples, a separator 132 providing a passage 134 for the return of the gases or vapours entrained in the fuel, to the tank. The drive from the motor to the pump spindle is as in the construction shown in Figures 2 and 3.

Figure 10 shows an arrangement in which the axes of the pump and the motor are parallel. This arrangement has the advantage that a particularly compact construction is provided. The unit is supported from a cover plate 140 and consists of a pump 142, which is attached to bosses 144 on the cover plate, and the motor 146. The motor is supported by a flange 148 attached to a lateral extension 149 from the top of the pump casing and the drive is between a gear 150 on the motor shaft and a gear 152 on the pump shaft through an intermediate gear 154.

In the example shown in Figures 11 and 12 the axis of the motor 200 is horizontal and the axis of the pump 201 is vertical and parallel to a cover plate 202. In order to relieve the tank wall and the attachment of the unit thereto of part of the weight of the unit means are provided for supporting the overhanging end of the motor independently of the cover plate. Surrounding the motor there is a cover 203 which has the general shape of a bell. The mouth of the cover is provided with a flange 204 which is secured to the flange 205 of the pump. The cover is formed with stiffening ribs 206 and has at its outer end a spherical boss 207 which constitutes a spigot and is located on the axis of the motor.

Within the tank there is a web or baffle plate 208 which extends vertically and parallel to the tank wall 209 to which the unit is attached. Secured to the face of the baffle nearer to the tank wall there is a resilient socket 210 for the reception of the spigot. The socket has a flared mouth and the resilience is provided by partially dividing the socket into separated fingers. The socket is arranged to grip the spigot.

In use, when it is desired to insert the pump unit into the tank it is only necessary to locate the spigot in the mouth of the socket and then to push the unit inwardly to force the spigot into the socket. The unit is finally secured by attachment of the cover plate to the tank. To remove the unit the cover plate is released from the tank and the unit removed in the axial direction of the motor thereby withdrawing the spigot from the socket. The spigot and socket connection provides substantial support for the pump and motor unit, to withstand the loads resulting from high speed flight manoeuvres.

It is to be understood that whereas in the above example the pump unit is supported from the tank at the outer end of the motor it is within the invention to support the unit intermediate in its length. For example the unit may be supported by means engaging the flanges 204 and 205.

The motor employed in the pumps according to the invention may be wound for two-speed operation, one winding being provided for an increased speed at overload to be used for a short time. A pump having a motor arranged in this way is particularly suitable for use with reaction engines employing for short periods of time re-heat, the high speed winding being employed to supply the re-heat fuel.

It is an advantage of the construction described in the above examples that the pump body provides a chamber above the sealing gland within which the gearing is located and that this chamber may be sealed and packed with lubricant. A further advantage is that the pump unit can be wholly contained within the fuel tank submerged in the fuel and there may be no internal connection beneath the wing or tank.

We claim:

1. An aircraft fuel supply system comprising a tank having an aperture in a vertical wall thereof, a cover plate for said aperture, a rotary pump having a cavitied body and a shaft carrying an impeller within the cavity of said body mounted upon said cover plate with its axis parallel to the plane thereof, an electric motor having a fluid-tight casing mounted on said pump body on the side thereof remote from said cover plate and with its shaft axis perpendicular to the plane of said cover plate, right-angled gearing interconnecting said pump shaft and the shaft of said motor, a fluid-tight chamber interconnecting said pump body and said fluid-tight casing of the motor and enclosing said right-angled gearing, a support member associated with said tank and disposed opposite to the said aperture, and a connection engageable and releasable by relative movement perpendicular to the plane of said cover plate between said support member and the end of said motor casing remote from said pump body.

2. For use in an aircraft fuel tank having an aperture in the wall thereof, a submersible fuel pump assembly comprising a cover plate for said aperture and, rigidly mounted on said cover plate, a unitary structure comprising a rotary pump having a cavitied body and a shaft projecting outside said body and within the cavity of the body an impeller carried by the shaft, an electric motor disposed at one side of the pump body and having a fluid-tight casing and a projecting rotatable shaft perpendicular to the axis of the impeller shaft and within the length of the pump body so that the dimension of said unitary structure in the direction of the axis of the impeller shaft is less than that of a similar coaxially disposed pump and motor unit, a fluid-tight chamber interconnecting said pump body and said motor casing and enclosing said projecting shafts of the pump and motor respectively and a bevel gear driving connection between said two shafts and enclosed within said fluid-tight chamber, the gear connection comprising a driven bevel gear secured to the pump shaft adjacent the pump body and a driving bevel gear secured to the motor shaft and located on the side of the driven gear nearer to the pump body.

3. A fuel pump assembly as claimed in claim 2 and comprising a duct leading from the interior of said chamber to the exterior of said cover plate for draining away any fluid that may enter said chamber.

4. A fuel pump assembly as claimed in claim 2 in which said pump body is mounted on said cover plate with the axis of said impeller shaft parallel to the plane of said cover plate.

5. A fuel pump assembly as claimed in claim 4 wherein the axis of said motor shaft is also perpendicular to the plane of said cover plate, the electric motor being on the side of the pump remote from the cover plate.

References Cited in the file of this patent

UNITED STATES PATENTS

| | | |
|---|---|---|
| 1,800,333 | Wertz | Apr. 14, 1931 |
| 1,870,192 | Butler | Aug. 2, 1932 |
| 1,930,293 | Valentine | Oct. 10, 1933 |
| 1,960,389 | McFerran, Jr. | May 29, 1939 |
| 2,368,529 | Edwards | Jan. 30, 1945 |
| 2,370,590 | Taylor | Feb. 27, 1945 |
| 2,413,546 | Curtis et al. | Dec. 31, 1946 |
| 2,500,834 | Korte | Mar. 14, 1950 |
| 2,530,357 | Kateley | Nov. 14, 1950 |